May 1, 1928.
E. C. LITCHFIELD ET AL
1,668,516
DISTRIBUTOR FOR MINERAL FERTILIZERS
Filed May 31, 1924    3 Sheets-Sheet 1
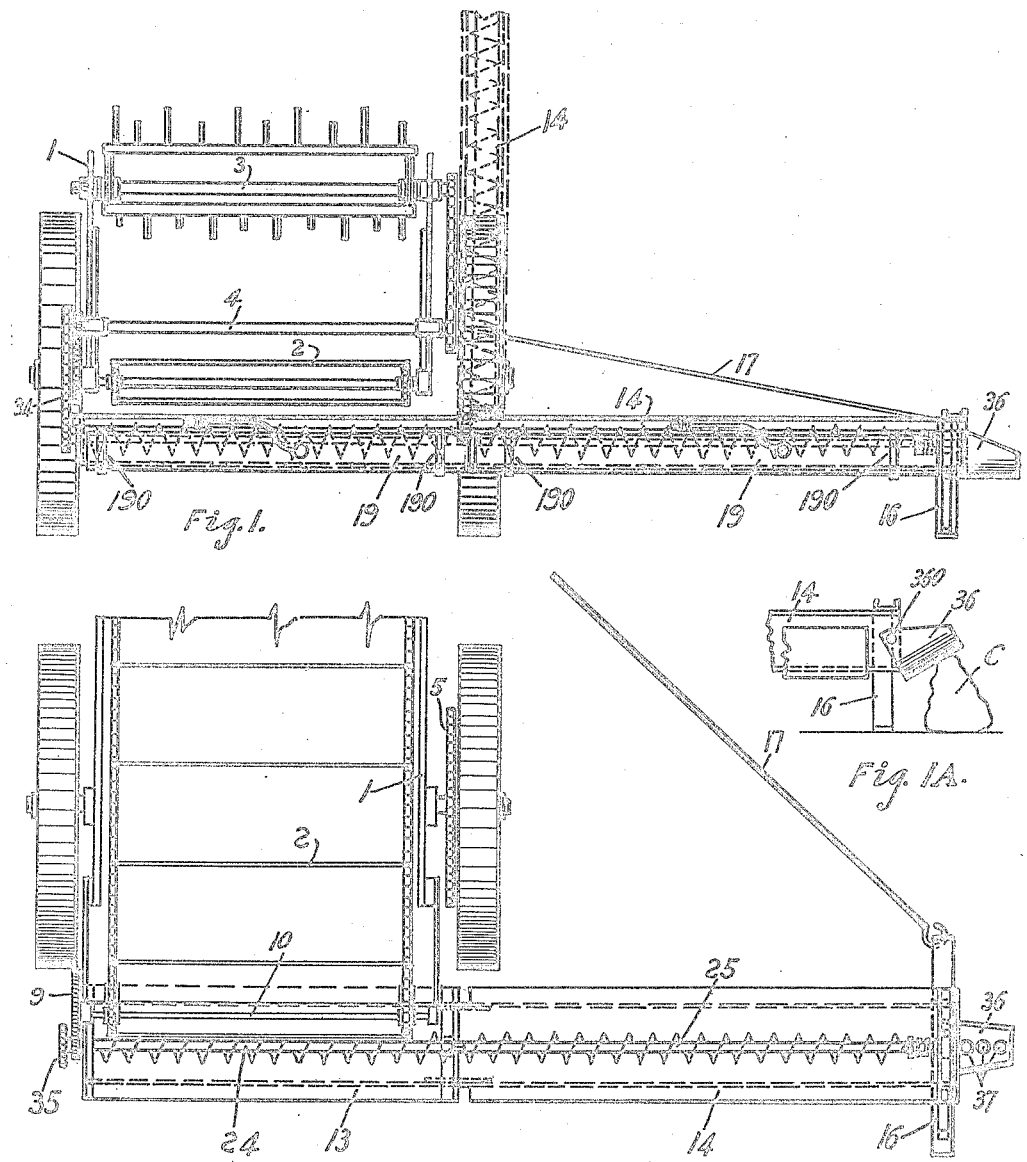
INVENTORS:
E. C. Litchfield,
C. C. Herman,
BY
Wm. F. Freudenreich
ATTORNEY

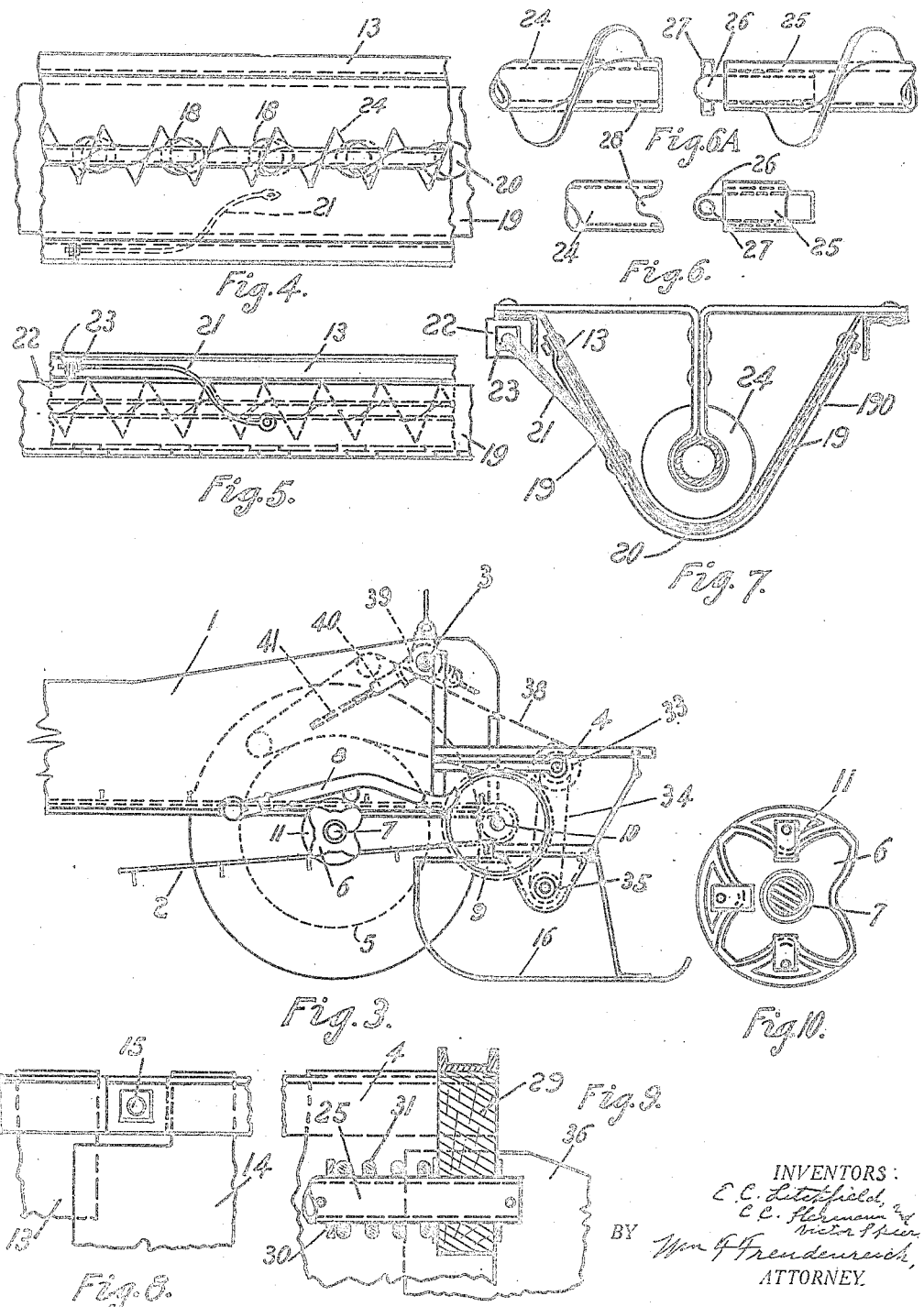

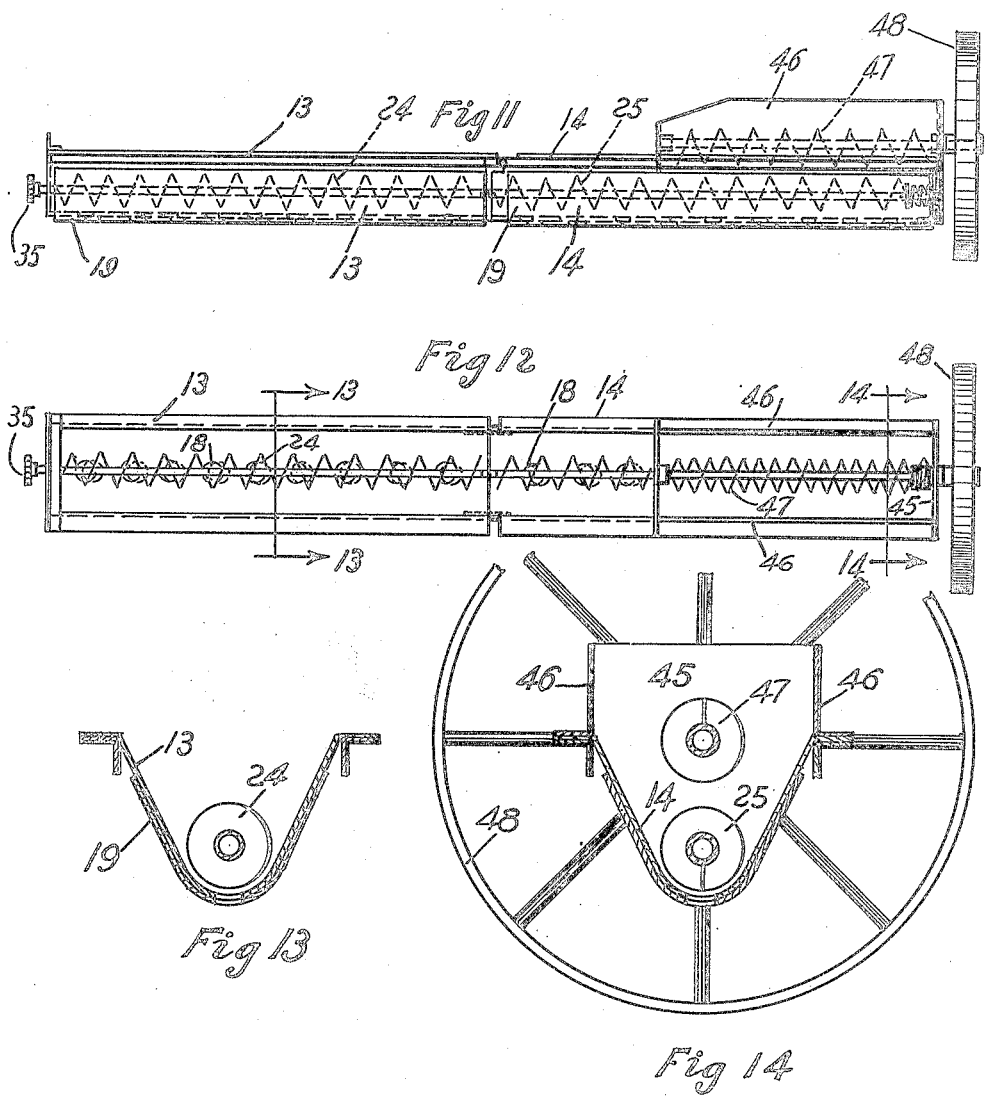

Patented May 1, 1928.

1,668,516

UNITED STATES PATENT OFFICE.

EDGAR C. LITCHFIELD, OF CEDAR FALLS, CLARENCE C. HERMANN, OF WATERLOO, AND VICTOR SPEER, OF CEDAR FALLS, IOWA, ASSIGNORS TO HENRY L. LITCHFIELD, OF WATERLOO, IOWA, AND EDGAR C. LITCHFIELD, OF CEDAR FALLS, IOWA.

DISTRIBUTOR FOR MINERAL FERTILIZERS.

Application filed May 31, 1924. Serial No. 716,912.

It is becoming more and more the custom to apply mineral fertilizers of various kinds to farmland. Where considerable areas are to be covered it is necessary, in order to secure uniform distribution of the fertilizer and reduce the labor cost, that the fertilizer be distributed by machines and not by hand. There are various machines designed especially for this purpose but, so far as we know, their usefulness is limited to this particular work, making them an expensive tool. Furthermore, presumably in order to reduce the initial cost, these machines are made of small capacity so that they must be frequently loaded, necessitating the hauling of the fertilizer to the place where it is to be distributed, and the subsequent loading of the same in comparatively small quantities on the distributing machines.

Every farmer has a farm wagon and the number of farmers who own machines, consisting essentially of a farm wagon with attachments, for spreading barnyard manure is constantly increasing.

The object of the present invention, viewed in one of its aspects, is to produce a distributing mechanism for mineral fertilizers that may be attached to a vehicle useful for other purposes, thereby reducing the initial cost of the distributing mechanism and at the same time affording a much larger loading capacity than the old type of machines have had.

In carrying out our invention, we have devised a distributing mechanism that can be attached to the rear end of a wagon body and be driven from the rear vehicle wheels. Where the wagon body is part of a manure spreader, we utilize portions of the spreading mechanism already present, for driving purposes and for securing an evenness of feed. Therefore, viewed in another of its aspects, our invention may be said to have for its object to produce, a simple, novel and efficient distributor for mineral fertilizers adapted to be associated with a manure spreader; whereby the latter may be employed efficiently to distribute fertilizers of both kinds.

The various features of novelty whereby our invention is characterized will hereinafter be pointed out with particularity in the claims; but, for a full understanding of our invention and of its various objects and advantages, including those heretofore enumerated, reference may be had to the following detailed description taken in connection with the accompanying drawings wherein:

Figure 1 is an end elevation of a manure spreader having attached thereto a distributor embodying the present invention, the outer end of the distributing trough being shown in full lines in its working position and in dotted lines in an idle position; Fig. 1ᴬ is an elevation of the outer end of the trough showing the extension thereon riding over an obstruction; Fig. 2 is a top plan view of the rear end of the machine shown in Fig. 1, the two beater wheels and their shafts being omitted; Fig. 3 is a side view of the rear end of the spreader; Fig. 4 is a top plan view, on an enlarged scale, of a section of the distributing trough; Fig. 5 is a side view of the part shown in Fig. 4; Fig. 6 and Fig. 6ᴬ are top and side views on an enlarged scale of the meeting ends of the two flights of the feeding and agitating screw, separated from each other; Fig. 7 is a transverse section on a larger scale than Figs. 4 and 5, through the distributing trough; Fig. 8 is a side view of a fragment of the distributing trough at the joint between the two sections into which it is divided; Fig. 9 is a vertical section through the outer end of the distributing trough, illustrating the means for supporting the outer end of the screw conveyor; Fig. 10 is a side view of the actuating cam for the apron forming the bottom of a spreader body, modified to suit a condition encountered in distributing mineral fertilizers; Fig. 11 is an elevation of a modified form of distributing trough; Fig. 12 is a top plan view of the trough shown in Fig. 11; Fig. 13 is a section on an enlarged scale, taken approximately on line 13—13 of Fig. 12; and Fig. 14 is a section, on the same scale as Fig. 13, taken approximately on line 14—14 of Fig. 12.

Our invention may of course take a great variety of forms but, for the sake of brevity, we have shown and shall confine the detailed description to only a few of them.

The construction disclosed in Figs. 1–10, which is a simple form of our invention as applied to a manure spreader, will first be described. Referring to these figures, 1 represents the vehicle body having therein suitable means for feeding the contents toward the rear as, for example, an endless apron 2 that forms the effective bottom of the body. The shafts for the usual upper and lower beater wheels are shown at 3 and 4. The beater wheels are adapted to be driven at high speed when the machine is used as a manure spreader from a sprocket wheel 5 attached to one of the rear traction wheels of the spreader. The movable apron must be driven at a slow speed. In the arrangement shown, this is accomplished by a cam 6 mounted on the rear axle 7 and causing a lever 8 alternately to rise and fall as the axle turns. The lever cooperates with a suitable ratchet wheel 9 fixed to the supporting shaft 10 for the rear end of the apron. As the actuating lever moves up and down the ratchet wheel is turned step by step, causing the apron to move slowly in the feeding direction. All these parts may be of any usual or suitable construction, the particular arrangement illustrated being a well known commercial spreader.

It is our purpose to provide means whereby mineral fertilizers may be placed in the spreader body, be fed toward the rear at the proper rate and be effectively distributed. There is a wide variation in the density to which mineral fertilizers are spread. Thus lime rock is ordinarily spread upon the land at a density of from three-quarters of a ton to as much as five tons to the acre. Commercial fertilizers are usually distributed much more lightly, sometimes as little as 300 lbs. to the acre being employed. Consequently, in some cases at least, the minimum rearward feed of the spreader will be too rapid when mineral fertilizers, particularly commercial fertilizers, are being distributed. This may conveniently be remedied by means of attachments to actuating cam 6 such that the number of strokes of the actuating lever 8 for each revolution of the rear axle will be decreased. The particular cam shown in Figs. 3 and 10 of the drawings has four elevations alternating with four depressions. Consequently, in the normal use of the cam, the actuating lever will rise and fall four times during each revolution of the rear axle. We provide blocks, such as indicated at 11, to fill the depressions between consecutive high points; the blocks being so shaped that if there be one in each depression, the periphery of the cam will be round or at least will have such a shape that it will not operate effectively as a cam. Therefore if one of the depressions is filled, the lever will rise and fall only three times during each revolution of the axle, while if two of the depressions are filled there will be two oscillations of the lever, and if three of the depressions be filled there will be only one oscillation of the lever. By this means the rate of travel of the apron may be reduced to three-fourths, one-half or one-fourth of the usual minimum speed, to suit the condition of the particular service for which the spreader happens to be utilized.

Mineral fertilizers cannot be effectively distributed by a mere beater wheel. Therefore the lower beater wheel is not required when such fertilizers are to be spread. However, to avoid the necessity of taking out the entire lower beater wheel, the bars may be removed and the shaft left in place. In lieu of the lower beater wheel we employ a trough extending horizontally across the rear of the spreader body, just below the discharge end of the apron, so that as the fertilizer reaches the discharge point it flows down into the trough. If the distribution took place over a zone having only the width of the spreader body, the process of covering a field would be too slow and provision must therefore be made to distribute over a width of from 8 to 12 ft. In the particular arrangement now under consideration the trough terminates at one end at one side of the spreader body, the other end extending out far beyond the other side of the body. This long trough may be in the way when the spreader is moving along a road when it must pass through gates or doors and we have therefore made it in two parts 13 and 14; the part 13 being approximately of the same width as the spreader body and the part 14 constituting the lateral extension. The two parts or sections are hinged together at their meeting ends at 15, the detail of the hinge joint being best shown in Fig. 8; the arrangement being such that when the two sections are aligned, their meeting ends overlap somewhat. When it is desired to shorten the transverse dimension of the spreader, the trough section 14 is simply swung about its hinge joint from the horizontal position shown in full lines in Figs. 1 and 2 to the upright position shown in dotted lines in Fig. 1. The extreme outer end of the movable section of the trough may be provided with a shoe 16 or other support adapted to rest on the ground. The movable section of the trough is further supported and braced by means of a suitable tension member 17 extending from the outer end thereof forwardly and upwardly to the spreader body.

The material is discharged from the trough through holes in the bottom of the same, these being indicated as round holes 18 distributed along the longitudinal center of the trough and best shown in Fig. 4. Depending on the character of the fertilizer and the density of distribution to be attained, the size of the discharge openings should vary. To this end we have placed under each trough section, and nested with the same, a trough-like slide 19 provided with holes 20 that are adapted to register wholly, partly, or not at all with the holes 18. The slides are supported by stiff bands 190 passing underneath the slides and fastened at their ends to the trough above the slides. Rods 21, each fixed at one end to one of the slides and extending at its other end through an ear 22 on the side of the main trough sections, serve to adjust the slides to vary the effective size of the feed openings or close them completely. There are nuts 23 on the rods on opposite sides of the ears and upon loosening the nuts, the rods 21 and the members 19 may be shifted lengthwise of the main troughs. Since the fertilizer is delivered into one end of the trough, it must be carried along the latter in some manner in order to secure distribution from the entire length of the trough. In the arrangement shown, there is a screw conveyor extending lengthwise through the trough and in the bottom of the same. The screw conveyor is illustrated as having a tubular shaft and it is made in two flights 24 and 25, corresponding in length to the two sections 13 and 14 of the trough. When the movable section of the trough is to be raised, the two flights of the screw conveyor must be uncoupled from each other. To this end, as best shown in Fig. 6, the inner end of the shaft of the flight 25 is provided with a pin 26 adapted to enter the adjacent end of the tubular shaft of flight 24, the diameter of the pin being considerably less than the internal diameter of the latter shaft for a purpose to be hereinafter explained. The pin 26 is provided with a cross-pin 27 that is adapted to enter a slot 28 cut through a diameter of the tubular shaft of the flight 24. When the pin 26 is withdrawn completely from the shaft of the flight 24, the flight 25 may be moved at will independently of the other flight The outer end of the flight 25 is preferably so mounted that while the two flights will normally be held in operative relation to each other, the outer flight may quickly and easily be drawn lengthwise to disconnect it. An arrangement for accomplishing this is illustrated in Fig. 9. The shaft of the flight 24 extends slidably and rotatably through a bearing block 29 extending across the upper half of the trough at its outer end. On the shaft, at some distance from the bearing block, is a collar or shoulder 30. Between the member 30 and the bearing block surrounding the shaft, is a coiled spring 31. The parts are so proportioned and the spring is under such initial compression, that the spring tends constantly to move the outer flight inwardly into interlocking engagement with the cooperative flight and hold it there. When the outer end of the trough is to be raised the operator grasps the outer flight and pulls it outwardly against the resistance of the spring until the two flights are uncoupled from each other. When the outer trough section is swung down into a horizontal position, after having been raised, the operator must again pull the outer flight outwardly and then permit it to be moved into engagement with the inner flight while the pin 27 is in registration with the slot 28.

There is another advantage resulting from the hinging of an end section of the distributing apparatus. When such an end section is swung into an inoperative position the remainder of the apparatus is still able to perform its distributing functions but over a reduced width. Therefore, where a very heavy distribution is required, the feed may be made such that all of the fertilizer will be distributed by that portion of the apparatus that remains in its operative position. Also, when for any reason it is desired to distribute over a narrow area, the end section may se swung into its idle position, and the distribution be done by the remainder of the apparatus.

As heretofore explained, the lower beater wheel of the spreader is not needed when mineral fertilizer is being distributed. However, the shaft of the lower beater wheel is left in position and on the end of this shaft is placed a sprocket wheel 33 over which passes a sprocket chain 34 that in turn extends around a sprocket wheel 35 on the end of the member 24 of the screw conveyor. Therefore, if the shaft of the lower beater wheel is driven in the same manner as when the spreader is being used to distribute manure, the screw conveyor will be rotated and will feed the material deposited into one end of the trough along the trough toward the opposite end. The conveyor not only feeds the material but also stirs or agitates it, so that it is prevented from piling up over the discharge outlets and clogging them. There may be some large pieces of fertilizing material particularly when the latter is lime rock, that will not pass through the discharge outlets in the bottom of the trough. If these pieces are left in the trough they may interfere more or less with the distribution. We have therefore placed at the extreme outer end of the section 14 of the trough a short extension 36 communicating with the trough through the space underneath the bearing block or wall 29 and open at the outer end. In the bottom of this extension are a few large holes 37. Therefore, as large pieces are carried outwardly along the trough, they finally reach the extension and drop to the ground through the large holes in the extension or through the open outer end of the same.

The extension is preferably hinged to the main trough, as indicated at 360 in Fig. 1A, and it is rounded on the bottom so that if an obstruction is encountered thereby, such as indicated at C in Fig. 1ᴬ, the extension will be swung up and will safely ride over the obstruction. In the same way, when the shoe 16 rides over a high spot in the ground, the outer section of the trough may swing upwardly and avoid objectionable stresses in the apparatus; the loose joint between the flights of the conveyor permitting a limited swinging movement of the outer flight.

As the fertilizer is fed rearwardly in the spreader body it may not be delivered evenly into the trough, but the material may hang to the advancing face of the moving mass until compelled to drop down in quantities of considerable bulk. In spreaders having upper beater wheels an even feed into the trough may readily be obtained by utilizing the upper beater wheel or portions thereof to scrape material from the face of the oncoming mass and cause it to flow down into the trough. For this purpose the upper beater wheel should run in the opposite direction from that in which it rotates in distributing manure or straw. This may be accomplished by employing a sprocket chain 38 which, in driving the shaft of the lower beater wheel, passes underneath a sprocket 39 on the shaft of the upper beater wheel and therefore rotates the latter in such a direction that the teeth or other elements carried thereby move downwardly along the face of the mass of fertilizer in the spreader and produce a downward scraping action thereon. While the ordinary beater wheel, properly driven, would be of assistance in insuring a uniform delivery of fertilizer to the trough, we prefer to remove one or more of the usual bars of the upper beater wheel and substitute therefor a special bar or bars 40 set on edge and provided with long teeth 41.

It will be seen that the mechanism for distributing mineral fertilizer, just described, may be applied to a manure spreader by simply adding an extra sprocket wheel, removing the bars from the lower beater wheel, reversing the direction of rotation of the upper beater wheel and, if found advisable, building up the actuating cam for the apron and applying one or more special bars to the upper beater wheel. Therefore, the same machine may be used to distribute the various kinds of fertilizers in an expeditious and even manner, without requiring the farmer to make any considerable investment for mechanism to distribute manure fertilizers if he already has a manure spreader.

If the fertilizer is delivered more rapidly than it can be discharged through the outlets in the bottom of the trough, some of the finer material that should be so distributed might be carried out through the open end of the trough into the extension and be discharged in considerable volume through the large openings in the bottom of the extension. If it be desired to avoid an occurrence of this kind, a construction such as shown in Figs. 11 to 14 may be employed. The trough in this form of our invention may be substantially the same as that heretofore described. However, instead of placing an extension at the outer end, we provide the outer end with a wall 45 closing the same and extending a considerable distance above the top of the trough. Auxiliary sides 46 rise from the sides of the trough section 14 from the end wall 45, these auxiliary sides or walls being of considerable length. The trough is therefore, in effect, made much deeper toward its outer end than elsewhere. In this deepened portion is placed a screw conveyor 47 lying considerably above and parallel with the flight 25. On the outer end of the conveyor 47 is placed a wheel 48 that is adapted to run on the ground. The parts are so proportioned that the main screw conveyor is driven in one direction, namely, that which feeds the fertilizer from the left toward the right as viewed in Figs. 11 and 12, while the auxiliary conveyor is rotated in the opposite direction and, if the fertilizer begins to pile up in the deepened end of the trough, moves the top of such material back along the trough so as to give it an opportunity to be discharged in the intended manner when the oncoming supply diminishes.

While we have illustrated and described only a few preferred forms of our invention we do not desire to be limited to the details there illustrated and described; but intend to cover all forms and arrangements that come within the definitions of our invention constituting the appended claims.

We claim:

1. The combination with a vehicle body, of a long horizontal distributing trough extending across an end of said body and having outlets disposed in the bottom thereof from one end to the other, and means in said trough constructed and arranged to feed fertilizer therein toward one end and to feed the top of a deep mass at said end a short distance toward the other end.

2. The combination with a vehicle body, of distributing apparatus including a long trough extending transversely of the same, means near the outer end of said trough for supporting the same from the ground, and an open-ended rounded-bottomed extension hinged to the trough beyond said means so as to be capable of swinging vertically.

3. In combination, a spreader body having an unobstructed open rear end, means for slowly feeding the contents of said body bodily toward the rear, apparatus below the rear end of the body for distributing mineral fertilizer over a swath wider than said body, and means for scraping fertilizer from the top to the bottom of the advancing face of the contents of the body downwardly into said apparatus.

4. In a spreader, a vehicle body open at the rear end, an upper shaft extending transversely across the upper portion of said body in the vicinity of said rear end, means in the bottom of said body for slowly feeding the contents toward the rear, a second shaft extending across and behind the rear end of said body below said upper shaft, apparatus below the rear end of said body adapted to receive fertilizer as it is discharged from said body and distribute it over a swath wider than said body, means on said upper shaft for scraping fertilizer from the advancing face of the contents of said body downwardly into said apparatus, means for driving said shafts, and a driving connection between said second shaft and said apparatus.

In testimony whereof, we sign this specification.

EDGAR C. LITCHFIELD.
CLARENCE C. HERMANN.
VICTOR SPEER.